United States Patent
Villaron et al.

(10) Patent No.: US 9,223,395 B2
(45) Date of Patent: Dec. 29, 2015

(54) VIEWING PRESENTATIONS IN A CONDENSED ANIMATION MODE

(75) Inventors: Shawn Alan Villaron, San Jose, CA (US); Jeffrey Edwin Murray, Mountain View, CA (US); Hannes Ruescher, Palo Alto, CA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 447 days.

(21) Appl. No.: 13/231,965

(22) Filed: Sep. 14, 2011

(65) Prior Publication Data

US 2013/0067336 A1    Mar. 14, 2013

(51) Int. Cl.
    *G06F 3/00*      (2006.01)
    *G06F 17/00*     (2006.01)
    *G06F 17/30*     (2006.01)

(52) U.S. Cl.
    CPC ............ *G06F 3/00* (2013.01); *G06F 17/30064* (2013.01)

(58) Field of Classification Search
    CPC ... G06F 17/30056; G06F 3/00; G06F 3/0481; G06F 3/0483; H04N 1/00442; H04N 1/00448
    USPC .................................................. 715/730, 732
    See application file for complete search history.

(56) References Cited

U.S. PATENT DOCUMENTS

| | | | | |
|---|---|---|---|---|
| 6,836,870 | B2 * | 12/2004 | Abrams ........................ | 715/730 |
| 7,810,043 | B2 | 10/2010 | Ostojic et al. | |
| 7,818,658 | B2 | 10/2010 | Chen | |
| 2001/0053277 | A1 | 12/2001 | Jun et al. | |
| 2006/0103655 | A1 * | 5/2006 | Nelson et al. ................. | 345/473 |
| 2006/0294469 | A1 * | 12/2006 | Sareen et al. ................. | 715/730 |
| 2007/0126741 | A1 * | 6/2007 | Gerhard et al. ............... | 345/473 |
| 2007/0150814 | A1 | 6/2007 | Morris | |
| 2009/0100373 | A1 | 4/2009 | Pixley et al. | |

(Continued)

FOREIGN PATENT DOCUMENTS

| CN | 101662675 A | 3/2010 |
|---|---|---|
| CN | 102156613 A | 8/2011 |

OTHER PUBLICATIONS

Mansfield, Richard .Mastering VBA for Microsoft® Office 2010. Chapters 1, 3, 24, and 25. Wiley Publishing. 2010 accessed via <safaribooksonline.com>.*

(Continued)

*Primary Examiner* — Amy M Levy
(74) *Attorney, Agent, or Firm* — Steve Crocker; Danielle Johnston-Holmes; Micky Minhas (57) ABSTRACT

Concepts and technologies are described herein for viewing presentations in a condensed animation mode in which a presentation program condenses or accelerates animations or effects within the presentation while maintaining the animations and effects associated with the presentation. The presentation program is configured to enter into a condensed animation mode and to render a slide of the presentation. In some embodiments, the presentation program waits for user input before playing an accelerated or condensed version of the animations and/or effects. In other embodiments, the presentation program plays the condensed or accelerated version upon rendering the slide without requiring further user input. If user input is received, the presentation program can be configured to wait for the animation sequence to complete before proceeding to the next slide and/or can interrupt playback of the animation sequence and proceed to the next slide of the presentation immediately.

20 Claims, 7 Drawing Sheets

(56) References Cited

U.S. PATENT DOCUMENTS

2009/0262116 A1* 10/2009 Zhao et al. .................... 345/473
2009/0303676 A1   12/2009 Behar et al.
2010/0201692 A1    8/2010 Niles et al.

OTHER PUBLICATIONS

Chinowsky, Ben. Getting Started with VBA in PowerPoint 2010. Nov. 2009 accessed <http://msdn.microsoft.com/en-us/library/ee814734(v=office.14).aspx> on <Dec. 1, 2013>.*

Office Archive .skipping animations questions and solutions posted to a web forum in Oct. 2004 and Nov. 2005. accessed <http://www.office-archive.com/11-powerpoint> on <Nov. 16, 2013>.*

WPI Academic Technology Center. Removing Animation from PowerPoint Slides. Feb. 6, 2006. retrieved from [www.wpi.edu/Academics/ATC/Collaboratory/Tips/General/animations.html] on [Apr. 27, 2014].*

Cerelli, Bob. Internet Explorer Tips. Changing the Search Pages Used by Internet Explorer 4.0 added Jan. 13, 1998. Retrieved from [www.onecomputerguy.com/ie_tips.htm#search_pages] on [Apr. 27, 2014].*

Learm to use Internet Explorer. Available Mar. 18, 2005 at Internet Explorer Guide [http://www.newbie.org/internet_explorer/] retrieved from Internet Archive [http://web.archive.org] on [Apr. 27, 2014].*

Typical synonyms. Retrieved from [http://thesausus.com] on [Apr. 27, 2014].*

Super User web site (various posters). Is there a way to change the default animation speed in PowerPoint. Posted Oct. 28, 2010, with answers posted Oct. 28, 2010-Jan. 29, 2011. Retrieved from [superuser.com/questions/204246/is-there-a-way-to-change-the-default-animation-speed-in-powerpoint] on [Apr. 27, 2014].* iSpring Solutions Inc. iSpring Pro Guide. Copyright 2005-2009. Retrieved from <http://www.ispringsolutions.com/kb/docs/pro/4.1/iSpring_Pro_Guide.pdf> on <Feb. 12, 2015>.*

Weverka. "PowerPoint 2007 All-in-One Desk Reference for Dummies®" published by Wiley Publishing. © 2007, Chapter 1. Taking Advantage of Transitions and Animations. pp. 405-509.*

Schnepf, et al., "Doing FLIPS: Flexible Interactive Presentation Synchronization", Retrieved at <<http://ieeexplore.ieee.org/stamp/stamp.jsp?tp=&arnumber=481698>>,IEEE Journal on Selected Areas in Communication, vol. 14, No. 1, Jan. 1996, pp. 114-125.

The Chinese Office Action mailed Jan. 29, 2015 for Chinese patent application No. 201210336758.3, a counterpart foreign application of U.S. Appl. No. 13/231,965, 14 pages.

* cited by examiner

VIEWING PRESENTATIONS IN A CONDENSED ANIMATION MODE

BACKGROUND

Presentation programs have become popular software for preparing, editing, and viewing electronic presentations such as slide shows, videos, flash animations, and the like ("presentations"). In some instances, presentations include a number of slides. Authors can use a presentation program to insert text, images, graphics, sound, and/or other objects into the slides. Presentation programs sometimes include functionality for configuring animations and/or effects for objects inserted or embedded within a presentation.

The animations and effects can include various variables settable by authors. Among the variables that may be controlled by the authors are time spans and playback rates associated with the animations and effects. Authors sometimes use animations and effects as a way of synchronizing the visual presentation with audio, music, and/or spoken information that may accompany the presentation. Thus, these time spans and other variables may be carefully choreographed by the author and may be integral to a presentation viewer's experience. These and other variables may be set by the authors and stored with the presentation, for example as object properties associated with the animated objects, and modification of these variables may therefore require editing of the presentation.

During viewing of a presentation, some presentation programs require user input to indicate to the presentation program that a user wishes to proceed to a next slide of the presentation and/or to commence playback of animations or effects associated with the slides. If an author configures a number of animations for a particular slide, a viewer may be required to enter a number of clicks or other input to view the various animations. Depending upon the device used by the user to view the presentation, and/or in circumstances in which a user wishes to browse through the entire presentation, submitting these repeated input actions such as mouse clicks may be tedious, difficult, distracting, and/or impractical.

It is with respect to these and other considerations that the disclosure made herein is presented.

SUMMARY

Concepts and technologies are described herein for viewing presentations in a condensed animation mode. In accordance with the concepts and technologies disclosed herein, a presentation program is configured to present a presentation in a condensed animation mode that condenses or accelerates animations or effects within the presentation while maintaining the animations and effects tailored by an author of the presentation. Thus, the presentation program can render slides and animations and effects associated with the slides in an accelerated or condensed format that allows users to browse through a presentation while maintaining animations and/or effects that be integral to the viewer experience tailored by a presentation author.

The presentation program is configured to enter into a condensed animation mode and to render a slide of the presentation. In some embodiments, the presentation program waits for user input before playing an accelerated or condensed version of the animations and/or effects. In other embodiments the presentation program automatically plays the condensed or accelerated version immediately upon rendering the slide and waits for user input before proceeding to a next slide. The presentation program presents the presentation in the condensed animation mode until the entire presentation has been shown, or until a user exits the condensed animation mode.

According to one aspect, the presentation program enters a condensed presentation mode, renders a slide, and begins playing the accelerated or condensed animation sequence. The presentation program waits for user input such as a mouse click. If the user input is detected, the presentation program determines if playback of the animation sequence associated with the rendered slide has completed. If the presentation program determines that playback of the animation sequence has not completed, the presentation program can be configured to ignore the user input and/or to wait for playback of the animation sequence to complete. If the playback of the animation sequence has completed, the presentation program can be configured to determine if additional slides are available.

If the presentation program determines that another slide is available, the presentation program advances to the next slide and renders the next slide. After rendering the next slide, the presentation program waits for additional user input, after which the presentation program begins playing the accelerated or condensed animation sequence associated with the next slide. In some embodiments, slides without animations are displayed until user input is received, after which the next slide, if existing, is obtained and rendered as mentioned above.

According to another aspect, the presentation program begins playing the accelerated or condensed animation sequence and determines, during or after the accelerated or condensed animation sequence is played, if user input such as a mouse click has been received. If the user input is detected, the presentation program can be configured to interrupt playback of the animation sequence if playback of the animation sequence has not yet completed.

After interrupting the playback of the animation sequence, or if playback of the animation sequence has completed, the presentation program determines if additional slides are available. If the presentation program determines that another slide is available, the presentation program advances to the next slide and renders the next slide. After rendering the next slide, the presentation program begins playing the accelerated or condensed animation sequence associated with the next slide. As mentioned above, slides without animations can be displayed until user input is received, in response to which the next slide can be rendered.

It should be appreciated that the above-described subject matter may be implemented as a computer-controlled apparatus, a computer process, a computing system, or as an article of manufacture such as a computer-readable storage medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

DETAILED DESCRIPTION

The following detailed description is directed to concepts and technologies for viewing presentations in a condensed animation mode. According to the concepts and technologies described herein, a presentation program is configured to present a presentation in a condensed animation mode that condenses or accelerates animations or effects within the presentation while maintaining the animations and effects tailored by an author of the presentation. Thus, the presentation program can render slides and animations and effects associated with the slides in an accelerated or condensed format that allows users to browse through a presentation while maintaining animations and/or effects that may be integral to the viewer experience.

According to various embodiments, the presentation program is configured to enter into a condensed animation mode and to render a slide of the presentation. In some embodiments, the presentation program waits fir user input before playing an accelerated or condensed version of the animations and/or effects. In other embodiments, the presentation program plays the condensed or accelerated version upon rendering the slide without requiring further user input. The presentation program can be configured to wait for the animation sequence to complete before accepting user input for proceeding to a next slide, or the presentation program can be configured to interrupt playback of the animation sequence and to proceed to the next slide if the user input is received during the playback. The presentation program can remain in the condensed animation mode until the entire presentation has been shown, or until a user exits the condensed animation mode.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and in which are shown by way of illustration specific embodiments or examples. Referring now to the drawings, in which like numerals represent like elements throughout the several figures, aspects of a computing system, computer-readable storage medium, and computer-implemented methodology for viewing presentations in a condensed animation mode will be presented.

Figure 1:
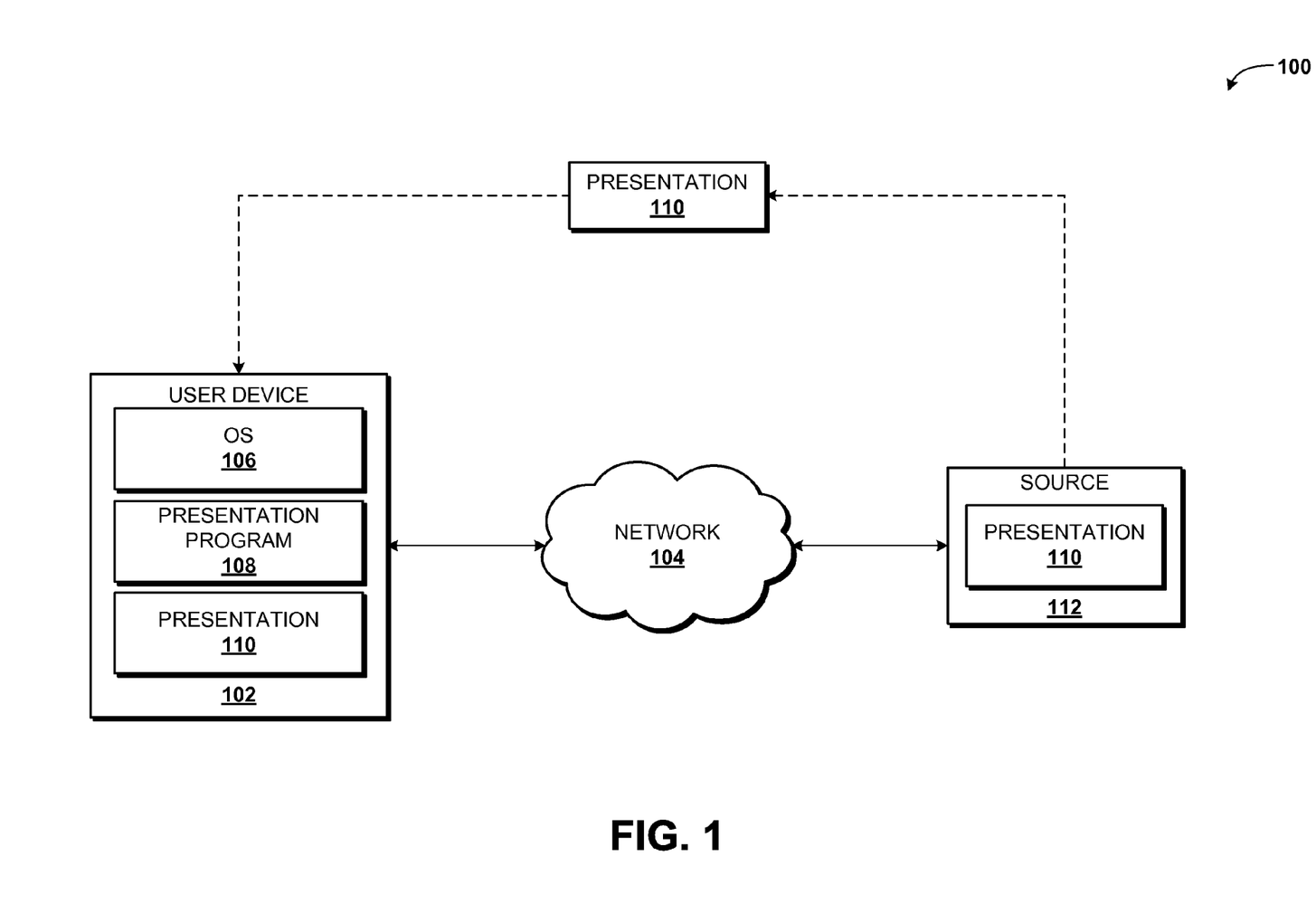
FIG. 1 is a system diagram illustrating an illustrative operating environment for the various embodiments disclosed herein.

Referring now to FIG. 1, aspects of one operating environment 100 for the various embodiments presented herein will the described. The operating environment 100 shown in FIG. 1 includes a user device 102. In some embodiments, the user device 102 operates on or in communication with a communications network ("network") 104, though this is not necessarily the case. According to various embodiments, the functionality of the user device 102 is provided by a personal computer ("PC") such as a desktop, tablet, or laptop computer system. In other embodiments, the functionality of the user device 102 is provided by other types of computing systems including, but not limited to, server computers, handheld computers, netbook computers, embedded computer systems, personal digital assistants, mobile telephones, smart phones, or other computing devices. Thus, while the functionality of the user device 102 is described herein as being provided by a PC, it should be understood that this embodiment is illustrative, and should not be construed as being limiting in any way.

According to various embodiments, the user device 102 is configured to execute an operating system 106 and one or more application programs such as, for example, a presentation program 108 and/or other application programs. The operating system 106 is a computer program for controlling the operation of the user device 102. The presentation program 108 is an executable program configured to execute on top of the operating system 106 to provide functionality for creating, editing, view, store, and/or share a slideshow presentation, a movie presentation, an audiovisual presentation, and/or other types of files ("presentation") 110. According to various embodiments, the functionality of the presentation program 108 is provided by a member of the POWERPOINT family of products from MICROSOFT CORPORATION in Redmond, Wash. In other embodiments, the functionality of the presentation program 108 is provided by a member of the PRESENTATIONS family of products from COREL CORPORATION in Ottawa, Ontario, a member of the IMPRESS family of products from OPENOFFICE.ORG, a member of the PREZI family of products, and/or a member of the KEYNOTE family of products from APPLE CORPORATION in Cupertino, Calif. Because the functionality of the presentation program 108 can be provided by other software packages, it should be understood that these embodiments are illustrative, and should not be construed as being limiting in any way.

According to various embodiments, the presentation program 108 is configured to receive or store the presentation 110. In some embodiments, the presentation 110 is stored at the user device 102 in a memory or other suitable data storage device. In some embodiments, the presentation 110 is obtained from a source 112 that is operating on or in communication with the network 104. The source 112 can be a networked hard drive, a server computer operating on the network 104 or in communication therewith, and/or any other suitable device. In some contemplated implementations of the concepts and technologies disclosed herein, the presentation 110 is provided to the user device 102 in response to a web search. It should be understood that this embodiment is illustrative, and should not be construed as being limiting in any way.

According to various embodiments of the concepts and technologies disclosed herein, the presentation program 108 is further configured to provide the functionality described herein for viewing animations in a condensed animation mode. The presentation program 108 can be configured to receive a command to present the presentation 110 to a user. As is generally understood, the presentation 110 can include a number of slides. The slides can includes various objects such as text, images, graphics, and/or other objects. Furthermore, each of these and other objects within the presentation 110 can be configured with various effects and/or animations. Thus, when a slide of the presentation 110 is presented, the animations and effects can be played for the viewer. Any number of animations can be configured for some, none, or all of the objects within a slide of the presentation 110.

Typically, each of the animations is played for a viewer in response to a separate mouse click or other user input detected by the presentation program 108. Thus, for example, if a slide of a presentation 110 includes three animations, a first click may present the slide in a base view corresponding to a view of the slide before the three animations are played. A second click or other user input can cause the presentation program 108 to play a first of the three animations, a third click can cause the presentation program 108 to play a second of the three animations, and a fourth click can cause the presentation program 108 to play a third of the three animations. Thus, it can be appreciated that a viewer attempting to browse through a presentation 110 may be required to click a mouse or otherwise enter input four or more times to browse through a single slide that includes three animations or effects.

Additionally, an author or other user may configure each of the animations associated with the presentation 110. The animations can be configured with time spans and other variables that can be used to control how the animations are played for the viewer. The time spans and other settings configured by the author are stored as part of the presentation 110 and generally cannot be modified without opening and editing the presentation 110. According to various embodiments of the concepts and technologies disclosed herein, however, the presentation program 108 is configured to play through some or all animations associated with a slide or presentation within a set time period or rate, without requiring user input and/or modification of the presentation 110.

In some embodiments, the presentation program 108 is configured to provide a condensed animation mode. The presentation program 108 can enter the condensed animation mode in response to user input, as a default viewing mode, in response to determining an identity or type of a device that is loading the presentation 110, and/or based upon other considerations or commands. As used herein, a "condensed animation mode" provided by the presentation program 108 corresponds to a mode in which the presentation 110 can be viewed by a user or viewer in a condensed format that retains animations and/or other effects while playing the animations and/or effects in an accelerated back-to-back fashion without requiring user input to proceed through the animations and/or without regard to the time spans or rates set by an author of the presentation 110.

While some presentation viewing applications allow presentations 110 to be viewed without showing or playing through embedded animations, these and other existing platforms may strip animations out of the presentation 110 entirely. Thus, these presentation viewing applications may show the slides of the presentation 110 as they appear prior to, or after completion of animations or effects associated with the slide. While this approach may allow a user to browse quickly through a presentation 110, this approach may significantly alter the author's intended viewing experience by completely removing effects and/or animations. Furthermore, because some objects within slides of the presentation 110 may enter and/or exit the slide during the animations, some objects of the slides may not be visible at the beginning or end of the animations. A viewer or user viewing the presentation 110 using the presentation program 108 disclosed herein, however, can view the presentation 110 in a condensed format that retains the effects and animations intended by an author of the presentation 110, but can nonetheless condense a time period in which the presentation 110 is viewed.

In some embodiments, the presentation program 108 is configured to enter a condensed animation mode. The presentation program 108 can be configured to enter the condensed animation mode in response to selection of a user interface ("UI") control provided by the presentation program 108, as a default mode associated with the presentation program 108, based upon identification of a device, or type of device, used to view the presentation 110, and/or based upon other input, commands, or considerations. The presentation program 108 detects user input such as a mouse click, a finger or stylus touch, swipe, or other gesture on or near a touch or multi-touch display, a voice command, a keystroke or string, or other input while in the condensed animation mode. In response to the input, the presentation program 108 renders a slide of the presentation 110. After detecting additional user input such as another mouse click or other input, the presentation program 108 can be configured to begin playing an animation sequence associated with the slide. According to various embodiments, the presentation program 108 plays any animations associated with the slide in an accelerated manner without pausing or requiring input between multiple animations within a slide.

The presentation program 1108 is configured in various embodiments to ignore time spans or rates associated with effects and/or animations. The presentation program 108 can be configured to condense some, all, or none of the animations associated with a slide to a set time span such as one second, two seconds, three seconds, ten seconds or any other desired time period. The presentation program 108 also can be configured to ignore user input received during playback of the animations. If a click is detected after the animation sequence is completed, the presentation program 108 determines if additional slides are available. If additional slides are available, the presentation program 108 renders the next slide. If no additional slides are available, the presentation program 108 ends the presentation 110.

In other embodiments, the presentation program 108 is configured to enter a condensed animation mode. The presentation program 108 detects a click or other user input while in the condensed animation mode, and in response to the input, the presentation program 108 renders a slide of the presentation 110 and begins playing animations associated with the slide in a condensed or accelerated manner. As mentioned above, the presentation program 108 can play some, all, or none of the animations associated with a slide in an accelerated back-to-back manner that requires no user input and/or fits the animations into a desired time span. The presentation program 108 is configured to detect a click or other user input received during playback of the animation sequence. If the presentation program detects a click or other input, the presentation program 108 interrupts the animation sequence and determines if additional slides are available. If additional slides are available, the next slide is rendered. If no additional slides are available, the presentation program 108 ends the presentation 110.

FIG. 1 illustrates one user device 102, one network 104, and one source 112. It should be understood, however, that some implementations of the operating environment 100 include multiple user devices 102, multiple networks 104, and no or multiple sources 112. Thus, the illustrated embodiments should be understood as being exemplary, and should not be construed as being limiting in any way.

Figure 2:
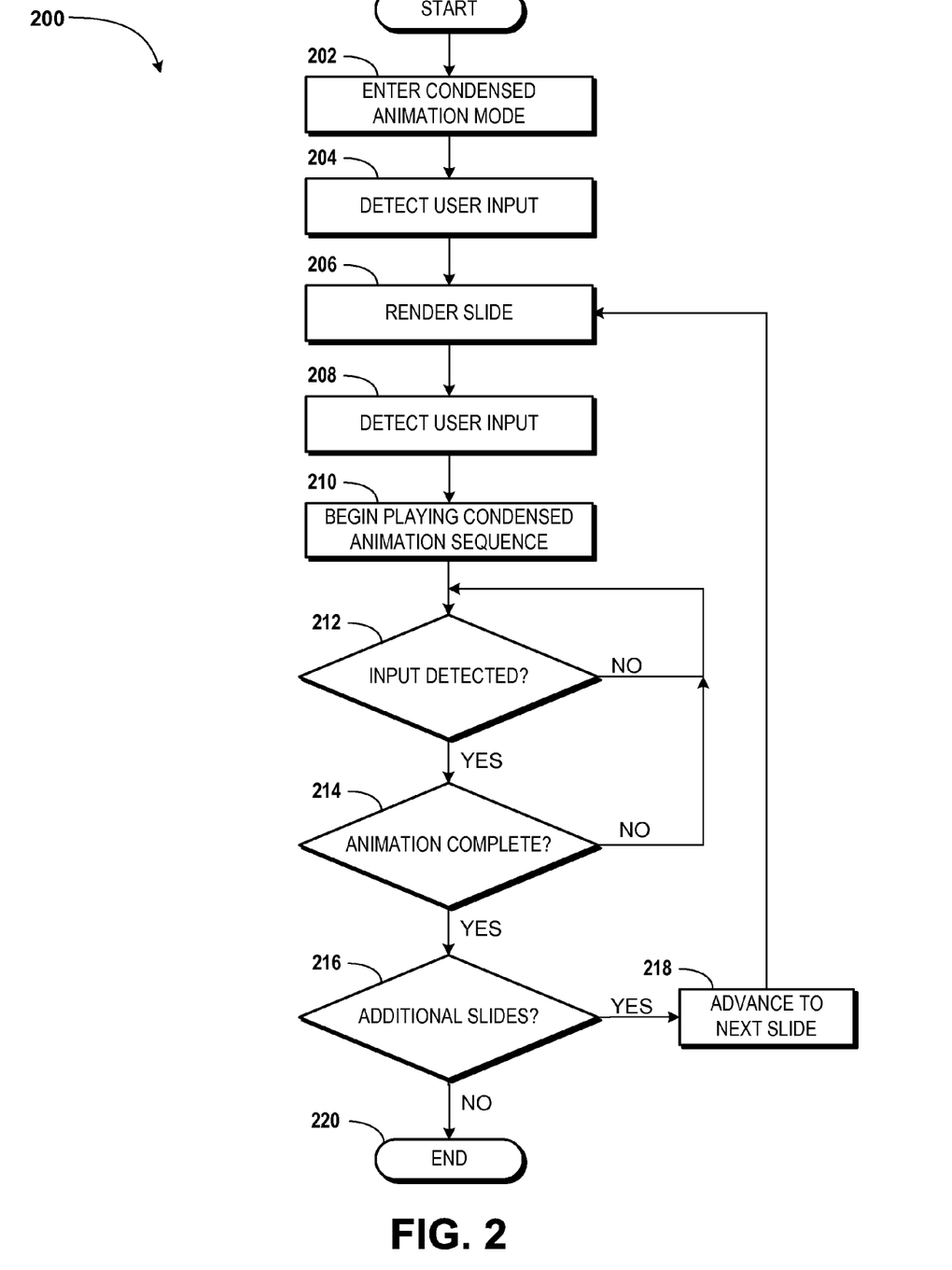
FIG. 2 is a flow diagram showing aspects of a method for viewing presentations in a condensed animation mode, according to an illustrative embodiment.

Turning now to FIG. 2, aspects of a method 200 for viewing presentations 110 in a condensed animation mode will be described in detail, according to an illustrative embodiment. It should be understood that the operations of the methods disclosed herein are not necessarily presented in any particular order and that performance of some or all of the operations in an alternative order(s) is possible and is contemplated. The operations have been presented in the demonstrated order for ease of description and illustration. Operations may be added, omitted, and/or performed simultaneously, without departing from the scope of the appended claims.

It also should be understood that the illustrated methods can be ended at any time and need not be performed in their respective entireties. Some or all operations of the methods, and/or substantially equivalent operations, can be performed by execution of computer-readable instructions included on a computer-storage media, as defined herein. The term "computer-readable instructions," and variants thereof, as used in the description and claims, is used expansively herein to include routines, applications, application modules, program modules, programs, components, data structures, algorithms, and the like. Computer-readable instructions can be implemented on various system configurations, including single-processor or multiprocessor systems, minicomputers, mainframe computers, personal computers, hand-held computing devices, microprocessor-based, programmable consumer electronics, combinations thereof, and the like.

Thus, it should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states, operations, structural devices, acts, or modules. These operations, structural devices, acts, and modules may be implemented in software, in firmware, in special purpose digital logic, and any combination thereof.

For purposes of illustrating and describing the concepts of the present disclosure, the methods disclosed herein are described as being performed by the user device 102 via execution of the presentation program 108. It should be understood that these embodiments are illustrative, and should not be viewed as being limiting in any way. In particular, it should be understood that any suitable device can be configured to provide the functionality disclosed herein via execution of any suitable program or module.

The method 200 begins at operation 202, wherein the presentation program 108 enters a condensed animation mode. The presentation program 108 can enter the condensed animation mode in response to receiving user input. For example, in some embodiments the presentation program 108 enters the condensed animation mode in response to detecting selection of a UI control presented by the presentation program 108. One suitable UI for presenting and/or detecting selection of a UI control for entering or initiating the condensed animation mode is presented below in FIG. 4A.

In other embodiments, the presentation program 108 is configured by user settings or options to enter the condensed animation mode when the presentation program 108 is used to load a presentation 110. For example, the presentation program 108 can be executed by a smart phone, tablet computer, or other device, and a default setting can be configured to enter the condensed reading mode when the presentation program 108 is used to view a presentation 110. In some embodiments, a portable device such as a smart phone may be tedious to use when viewing a presentation 110 that includes a number of animations, as several user input commands may be required to progress through the number of animations.

In yet other embodiments, the presentation program 108 is configured to enter the condensed animation mode if the presentation program 108 is used to view a presentation 110 that was not created by a viewer or user associated with the device executing the presentation program 108. In view of the multiple embodiments described above, it can be appreciated that the condensed animation mode can be started by user input, user settings, user options, software settings, identification of a device used to view a presentation 110, and/or based upon other data, input, or considerations. Thus, it should be understood that the above-mentioned embodiments for entering or initiating the condensed animation mode are illustrative, and should not be construed as being limiting in any way.

From operation 202, the method 200 proceeds to operation 204, wherein the presentation program 108 detects user input. According to various embodiments, the user input can include any suitable input received at the presentation program 108 via any suitable user input device. For example, the user input can correspond to a touch input, a multi-touch input, a movement of the user device 102, a voice command, a mouse click, a gesture in free space, a data signal received from a remote transmitter or network connection, and/or any other input receivable or detectable by the user device 102. The user input can be interpreted by the presentation program 108 as a command to render a slide of the presentation 110.

From operation 204, the method 200 proceeds to operation 206, wherein the presentation program 108 renders a slide of the presentation 110. In some embodiments, the presentation program 108 renders a first slide of the presentation 110. In other embodiments, the presentation program 108 renders a slide of the presentation 110 being viewed when the user input is detected in operation 204. The user or software can specify what slide to render and/or rules, options, and/or settings for selecting a slide to render.

According to various implementations, the presentation program 108 renders the slide in a base view. As used herein, a "base view" of a slide refers to view of the slide prior to playing or applying any animations or effects associated with the slide. As such, a user can see the slide in a view that would be presented in a full version of the slide show before animations or effects are played. As such, objects that appear in a slide during animation of the slide may not be visible when the base view of the slide is rendered in operation 206. Similarly, objects that disappear from a slide during animation of the slide may be visible when the base view of the slide is rendered in operation 206.

From operation 206, the method 200 proceeds to operation 208, wherein the presentation program 108 detects additional user input. As explained above with regard to operation 204, the user input can correspond to any suitable input received at the presentation program 108 via any suitable user input device. According to one illustrative embodiment, the user input received in operation 208 corresponds to a mouse click. It should be understood that this embodiment is illustrative, and should not be construed as being limiting in any way.

From operation 208, the method 200 proceeds to operation 210, wherein the presentation program 108 begins playing a condensed animation sequence. The condensed animation sequence can include playing through animations associated with the slide rendered in operation 206. As will be described in more detail below with reference to FIG. 4A, a slide can include a number of animations that may be configured by an author to be played in response to user input such as a mouse click, voice command, or the like. Each of the animations associated with a particular slide can the configured to be commenced in response to a separate user input received by the presentation program 108. As such, the presentation 110 may be configured by an author to require multiple user inputs to view all animations or effects associated with a particular slide.

According to embodiments of the concepts and technologies disclosed herein, the click detected in operation 208 is detected while the presentation program 108 is operating in the condensed animation mode. As such, the presentation program 108 is configured to ignore the animation settings configured by the author of the presentation 110 and to provide a condensed animation sequence. The presentation program 108 can be configured to present animations associated with the slide in a condensed and/or accelerated manner in which the presentation program 108 plays a first animation associated with the slide and immediately proceeds to a next animation associated with the slide without requiring any user input to commence the next animation. This playback of the animations cart be repeated by the presentation program 108 until the animations associated with the slide have been shown. According to some embodiments, the animations associated with the slide rendered in operation 206 are presented without additional user input in a back-to-back manner.

The presentation program 108 also cart be configured to ignore time spans, rates, speeds, and the like associated with the animations during playing of the condensed animation sequence. Thus, the presentation program 108 can be configured to show the animations in a back-to-back manner over a specified period of time such as two seconds, three seconds, or another time period specified by a user, preferences, user settings, options, and/or by the presentation program 108. As such, a user viewing a presentation 110 in the condensed animation mode may be able to view any objects, animations, and effects associated with the presentation, albeit in an accelerated manner. Thus, some embodiments of the concepts and technologies disclosed herein allow users to see the presentation 110 with the effects and animations created by the author of the presentation 110, though these animations and effects are viewed in an accelerated or condensed format that can be conducive to allowing a user to browse through the animation.

From operation 210, the method 200 proceeds to operation 212, wherein the presentation program 108 determines if additional user input has been detected. If the presentation program 108 determines, in operation 212, that additional user input has not been detected, the method 200 returns to operation 212. Thus, the presentation program 108 can repeat operation 212 until additional user input such is detected by the presentation program 108. If the presentation program 108 determines, at operation 212 that additional user input has been detected, the method 200 proceeds to operation 214.

At operation 214, the presentation program 108 determines if the condensed animation sequence playback begun in operation 210 has completed. As mentioned above, the condensed animation sequence can include playback of animations and effects associated with a slide in a back-to-back and/or accelerated manner. If the presentation program 108 determines, in operation 214, that the condensed animation playback has not completed, the method 200 returns to operation 212, wherein the presentation program 108 waits for additional user input to be detected. If the presentation program 108 determines, in operation 214, that the condensed animation playback is complete, the method 200 proceeds to operation 216.

At operation 216, the presentation program 108 determines if the presentation 110 includes additional slides. If the presentation program 108 determines, in operation 216, that additional slides exist in the presentation 110, the method 200 proceeds to operation 218. At operation 218, the presentation program 108 advances the presentation 110 to the next slide. From operation 218, the method 200 returns to operation 206, wherein the next slide of the presentation 110 is rendered by the presentation program 108. The presentation program 108 repeats operations 206 through 216 until the presentation program 108 determines, in any iteration of operation 216, that additional slides are not available. If the presentation program 108 determines, in operation 216, that additional slides are not available within the presentation 110, the method 200 proceeds to operation 220. The method 200 ends at operation 220.

It should be understood that some slides of a presentation 110 may not include animations and/or effects. Some embodiments of the presentation program 108 in accordance with the concepts and technologies disclosed herein include functionality for indicating to a user or viewer that a slide does not include animations when viewed in a condensed animation mode. For example, in some embodiments the presentation program 108 presents a banner or other indicator on a user display that indicates that a rendered slide does not include animations or effects. This banner or indicator can be shown to users or viewers when the slide is viewed using a presentation program 108 in a condensed animation mode.

In one contemplated embodiment of method 200, a slide rendered in operation 206 includes no animations or effects. As such, a banner or indicator such as the banner or indicator described above can be displayed in operation 210. The banner or indicator can be, but is not necessarily, displayed in response to a user input detected in operation 208. Thus, if additional user input is detected at operation 212, the method 200 can proceed directly to operation 216 since no animation sequence will have been played and therefore can be treated as being completed by the presentation program 108. From operation 216, the method 200 can be repeated and/or can terminate as described above. It should be understood that this embodiment is illustrative, and should not be construed as being limiting in any way.

Figure 3:
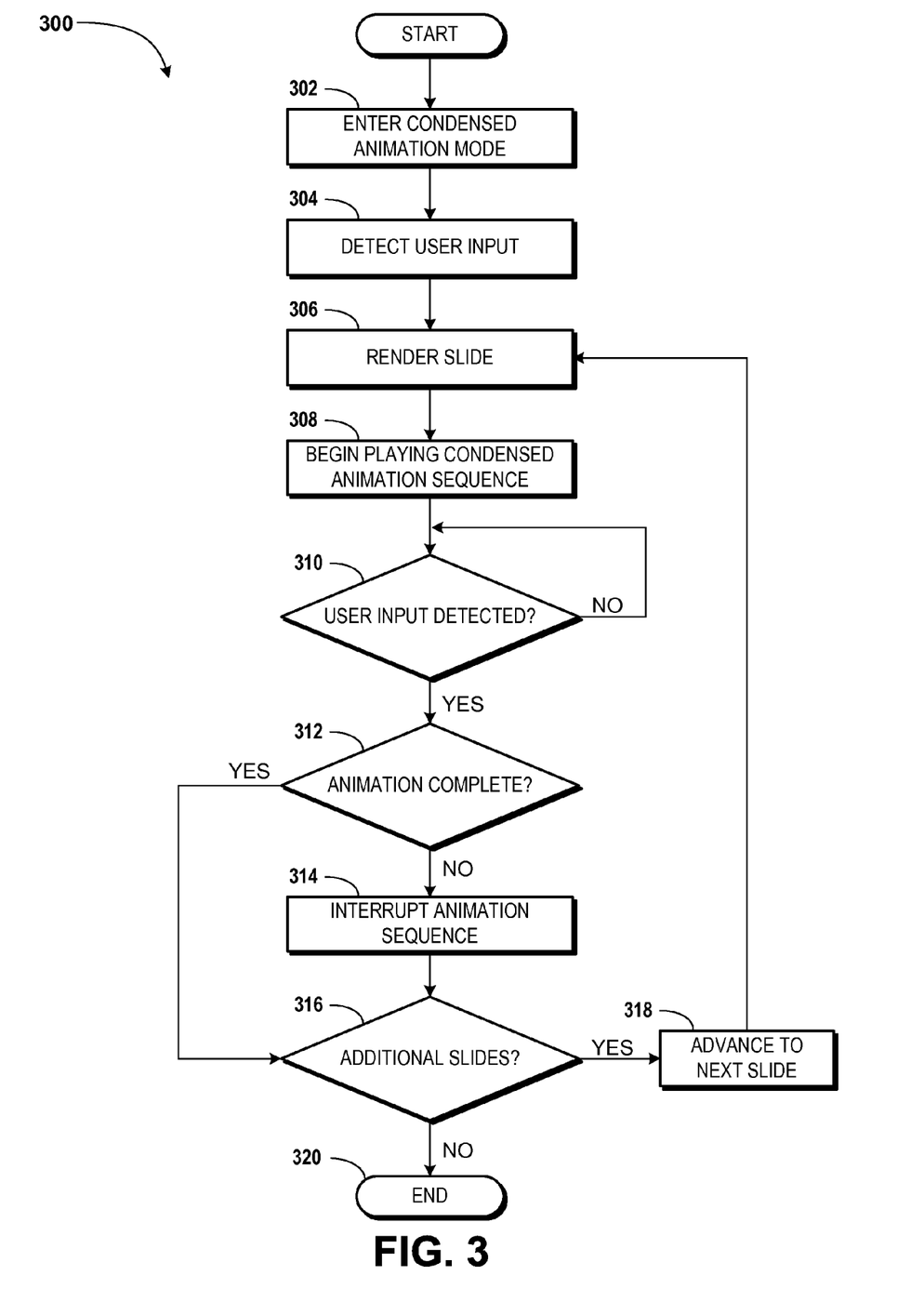
FIG. 3 is a flow diagram showing aspects of a method for viewing presentations in a condensed animation mode, according to another illustrative embodiment.

Turning now to FIG. 3, a method 300 for viewing presentations 110 in a condensed animation mode will be described, according to another illustrative embodiment. The method 300 begins at operation 302, wherein the presentation program 108 enters a condensed animation mode. As explained above with reference to operation 202, the condensed animation mode can be entered in response to a command received by the presentation program 108, as a default setting, in response to determining a device or type of device used to view the presentation 110, and/or in response to other input, settings, and/or considerations. It should be understood that functionality of the presentation program 108 in operation 302 can be, but is not necessarily, substantially similar to the operation 202 described above with reference to FIG. 2.

From operation 302, the method 300 proceeds to operation 304, wherein the presentation program 108 detects user input such as a mouse click, a voice command, a remote control signal, a key stroke, and/or other user input. From operation 304, the method 300 proceeds to operation 306, wherein the presentation program 108 renders a slide of the presentation 110. It should be understood that the functionality of the presentation program in operations 304-306 can be, but is not necessarily, substantially similar to the operations 204-206 described above with reference to FIG. 2.

From operation 306, the method 300 proceeds to operation 308, wherein the presentation program 108 begins playing a condensed animation sequence. As explained above with regard to operation 210, the condensed animation sequence can include presentation of animations and/or effects associated with the slide rendered in operation 306, wherein the animations and/or effects are presented in an accelerated and/or back-to-back manner that does not require additional user input between multiple animations to commence playback of the animations.

From operation 308, the method 300 proceeds to operation 310, wherein the presentation program 108 determines if additional user input has been detected. If the presentation program 108 determines, in operation 310, that additional user input has not been detected, the method 300 returns to operation 310. Thus, the presentation program 108 can repeat operation 310 until additional user input is detected by the presentation program 108. If the presentation program 108 determines, at operation 310 that additional user input has been detected, the method 300 proceeds to operation 312.

At operation 312, the presentation program 108 can determine if the condensed animation sequence begun in operation 308 has completed. If the presentation program 108 determines, in operation 312, that the condensed animation sequence begun in operation 308 has not completed, the method 300 proceeds to operation 314. At operation 314, the presentation program 108 interrupts playback of the condensed animation sequence begun in operation 308. Thus, the user input detected in operation 310 can be interpreted by the presentation program 108 as a command to immediately proceed to the next slide of the presentation 110.

From operation 314 and/or if the presentation program 108 determines in operation 312 that the condensed animation sequence begun in operation 308 has completed, the method 300 proceeds to operation 316. At operation 316, the presentation program 108 determines if the presentation 110 includes additional slides. If the presentation program 108 determines, in operation 316, that additional slides exist in the presentation 110, the method 300 proceeds to operation 318.

At operation 318, the presentation program 108 advances the presentation 110 to the next slide. From operation 318, the method 300 returns to operation 306, wherein the next slide of the presentation 110 is rendered by the presentation program 108. The presentation program 108 repeats operations 306 through 316 until the presentation program 108 determines, in any iteration of operation 316, that additional slides are not available. If the presentation program 108 determines, in operation 316, that additional slides are not available within the presentation 110, the method 300 proceeds to operation 320. The method 300 ends at operation 320.

Figure 4A:
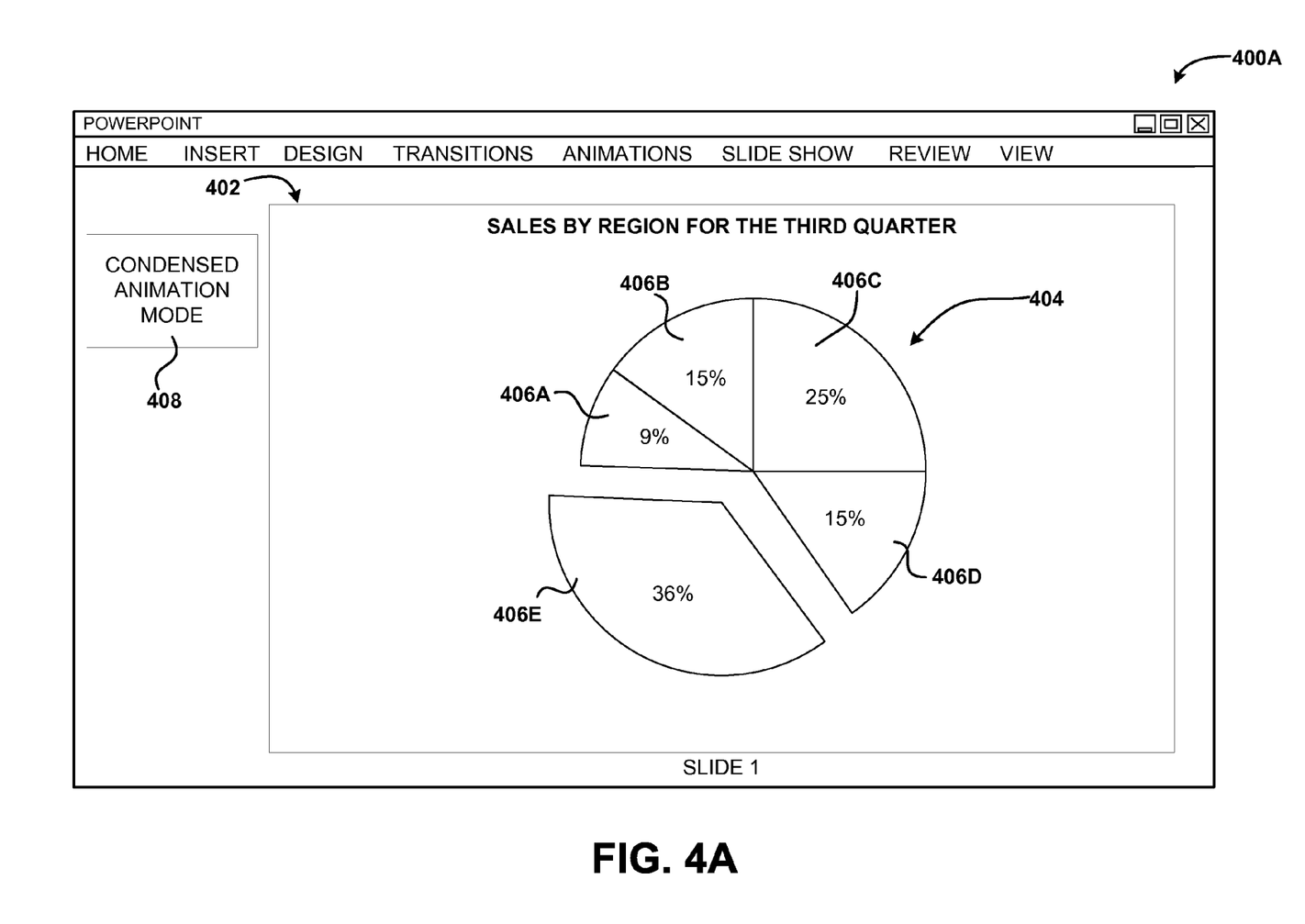
FIGS. 4A-4C are user interface diagrams showing aspects of a user interface for viewing presentations in a condensed animation mode, according to an illustrative embodiment.

Turning now to FIG. 4A, a UI diagram showing aspects of a UI for viewing presentations 110 in some embodiments will be described. The UI illustrated in FIG. 4A can be, but is not necessarily, used to enter a command for viewing a presentation 110 in a condensed animation mode. In particular, FIG. 4A shows a screen display 400A generated by the presentation program 108 configured to provide the functionality here for viewing presentations 110 in a condensed animation mode. It should be appreciated that the UI diagram illustrated in FIG. 4A is illustrative of one contemplated embodiment, and therefore should not be construed as being limited in any way.

In the illustrated embodiment, the screen display 400A is configured to present an interface for creating, viewing, and/or editing slides of a slide show presentation. An example slide 402 is shown in FIG. 4A. It can be appreciated that various menus, icons, command ribbons, and/or other UIs for controlling the functionality of the presentation program 108 can be presented on the screen display 400A. While some illustrative command menus are shown in FIG. 4A, these command menus are illustrative and should not be construed as being limiting in any way. In the example slide 402, an example graph 404 is shown. In order to describe the concepts and technologies disclosed herein, the graph 404 is described as being animated by way of various animations and/or effects. This embodiment is illustrative, and should not be construed as being limited in any way.

As shown, the graph 404 includes live portions or slices ("slices") 406A-E (hereinafter collectively and/or generically referred to as slices 406). Some or all of the slices 406 can be animated by an author of the presentation 110. For example, in one contemplated embodiment, each of the slices 406 is animated and data associated with the animations is stored with the presentation 110. In one contemplated embodiment, each of the slices 406 is hidden when the slide is first rendered in a base view, and animations are tailored to make each of the slices 406 visible when user input is received. Thus, an author of the presentation 110 can tailor the animations, for example, to allow a presenter to speak about the slice 406A while hiding the slices 406B-E from viewers. Thus, the animations can be tailored by an author of the presentation 110 such that the slices 406 appear in succession upon detection of user input such as a mouse click, a voice command, a touch or multi-touch gesture, or the like.

According to various implementations of the presentation program 108 disclosed herein, the presentation program 108 is configured to enter a condensed animation mode. The screen display 400A includes a UI control 408, the selection of which causes the presentation program 108 to enter a condensed animation mode as described herein. As mentioned above, the presentation program 108 also can be configured to enter the condensed animation mode automatically, based upon user settings or options, and/or based upon other considerations.

As explained above, in a condensed animation mode, the presentation program 108 can render the slide 402 in a base view as described herein in response to user input for showing the slide 402. In the example described above, wherein the slices 406 are animated to appear on the screen in response to user input, the base view of the slide 402 can include the title "Sales by Region for the Third Quarter" and an empty space where the graph 404 is illustrated in FIG. 4A.

If the presentation program 108 is configured in accordance with the method 200 described above, the presentation program 108 can wait for user input while displaying the base view of the slide 402. If the user input is detected, the presentation program 108 can play the five animations associated with the slices 406 in a back-to-back and/or accelerated manner. Thus, the presentation program 108 can make the slices 406 appear in an accelerated fashion, for example two seconds, without requiring a user or viewer to provide additional user input between the animations associated with each of the slices 406. It should be understood that this embodiment is illustrative, and should not be construed as being limiting in any way.

If the presentation program 108 is configured in accordance with the method 300 described above, the presentation program 108 can play the five animations associated with the slices 406 in a back-to-back and/or accelerated manner after rendering the slide 402 in the base view without requiring additional user input. The presentation program 108 can make the slices 406 appear in an accelerated fashion, for example two seconds, without requiring a user or viewer to provide additional user input between the animations associated with each of the slices 406. It should be understood that this embodiment is illustrative, and should not be construed as being limiting in any way.

Figure 4B:
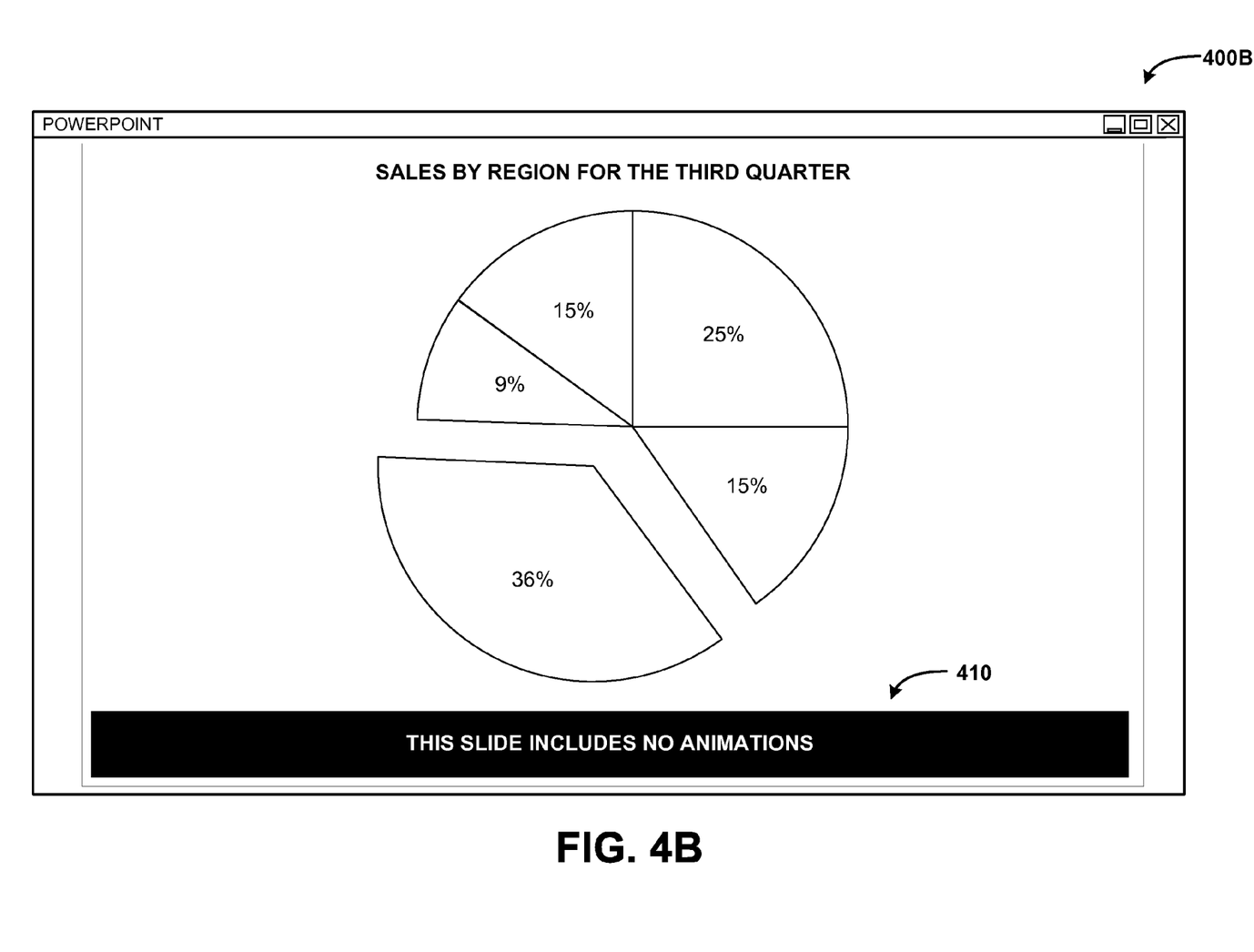

Turning now to FIG. 4B, a UI diagram showing aspects of a UI for viewing presentations 110 in another embodiment will be described. The UI illustrated in FIG. 4B can be, but is not necessarily, generated by the presentation program 108 in response to rendering a slide in operations 206 or 306 of the method 200 and 300 illustrated in FIGS. 2 and 3, respectively. As explained above, the presentation program 108 can be configured to determine that no animations or effects are included in a slide of a presentation 110, and in response to making this determining, the presentation program 108 can generate an indication or banner for informing a user that a rendered slide does not include animations or effects.

FIG. 4B shows a screen display 400B generated by the presentation program 108 configured to provide the functionality here for viewing presentations 110 in a condensed animation mode. It should be appreciated that the UI diagram illustrated in FIG. 4B is illustrative of one contemplated embodiment, and therefore should not be construed as being limited in any way. The screen display 400B includes an indicator 410. The indicator 410 informs a viewer that the displayed slide does not include any animations. Thus, the screen display 400B can be used to inform a user that user input will advance to a next slide, if present, instead of commencing a condensed animation sequence. As explained above, the functionality of the presentation program 108 illustrated in FIG. 4B is optional and therefore should not be construed as being limiting in any way.

While the above description has described the presentations 110 as slide shows or similar documents, it should be understood that these embodiments are illustrative. In particular, the condensed animation mode can be employed in other software for viewing other types of files. For example, a condensed animation mode can be provided by a web browser during viewing of a flash animation, by a multimedia viewer during viewing of a video or other audiovisual presentation, and/or by other application programs configured for viewing other types of files or documents. In these embodiments, the functionality described herein with respect to slides of a slide shown presentation can be provided with respect to any suitable portions of the documents such as pages, frames, time portions, and the like. As such, the embodiments described herein should be understood as being illustrative of some contemplated embodiments, and should not be construed as being limiting in any way.

While the above embodiments have been described and illustrated as being presented by a presentation program 108 presented by a desktop, notebook, or tablet computer, it should be understood that additional or alternative embodiments are contemplated and are possible. In particular, in some embodiments, the presentation program 108 is executed by a device such as a smart phone, pad or tablet computer, a network book computer, a personal data assistant ("PDA") and/or other devices that may use one or more input devices for interfacing with users. For example, the presentation program 108 can be executed on a smartphone, a tablet device, or other device that uses a touch screen, a stylus, keyboard-only commands, voice commands, and/or other input to interact with the presentation program 108. As such, the condensed animation mode described herein can be triggered automatically, as noted above, or in response to a touch gesture, a multi-touch gesture, a voice command such as "condensed animation mode," a stylus touch over a UI control for initiating the condensed animation mode, a gesture made in free space, a keyboard stroke or combination, a mouse click, and/or other commands or inputs.

Figure 4C:
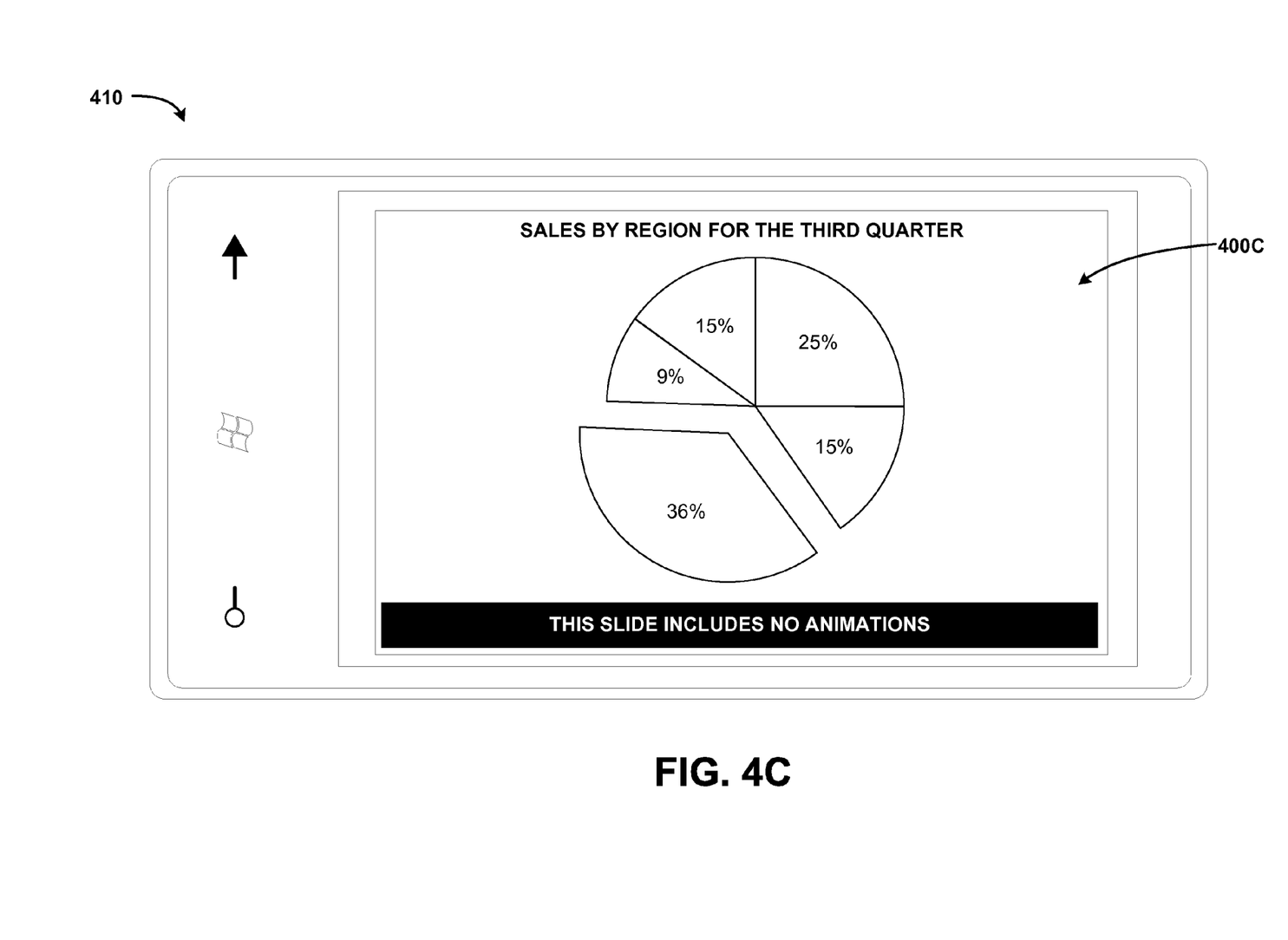

An illustrative embodiment of a UI presented by the presentation program 108 at a smartphone or other portable computing device is illustrated in FIG. 4C. In the illustrated embodiment, a smartphone 410 presents a screen display 400C. It should be understood that this embodiment is illustrative, and should not be construed as being limiting in any way. In particular, as explained above, other portable computing devices can execute the presentation program 108 in addition to, or instead of, the illustrated smartphone 410.

In some embodiments, the condensed animation mode is triggered by default, by user settings, and/or by user options when the presentation 110 is viewed at the smartphone 410. In other embodiments, as explained above, a gesture, voice command, tap, stylus touch, and/or other input can be used to activate the condensed animation mode. Also, while the smartphone 410 is shown rotated into landscape orientation in the illustrated view, this is illustrative and should not be construed as being limited in any way.

Figure 5:
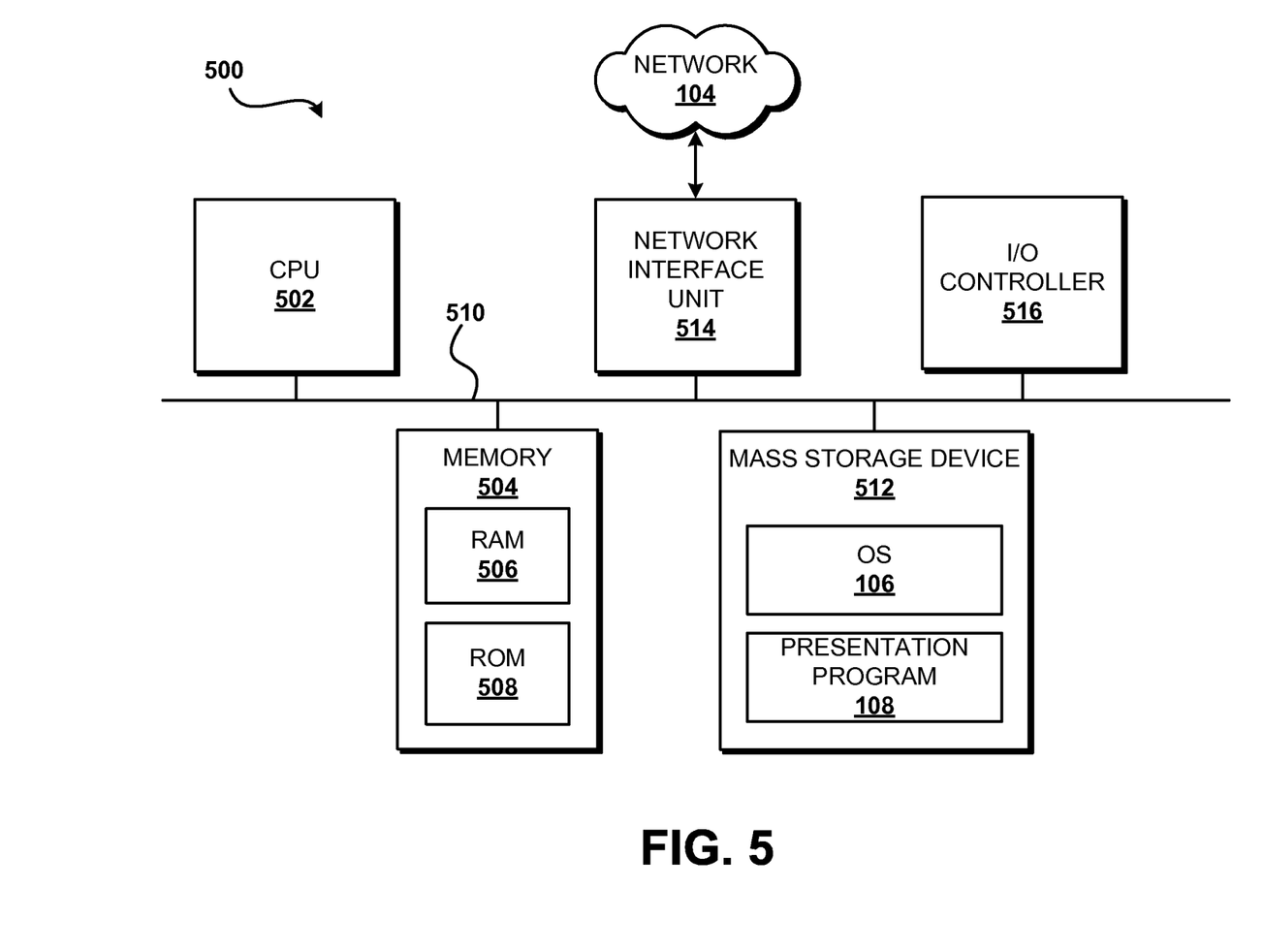
FIG. 5 is a computer architecture diagram illustrating an illustrative computer hardware and software architecture for a computing system capable of implementing aspects of the embodiments presented herein.

FIG. 5 illustrates an illustrative computer architecture 500 for a device capable of executing the software components described herein for viewing presentations in a condensed animation mode. Thus, the computer architecture 500 illustrated in FIG. 5 illustrates an architecture for a server computer, mobile phone, a PDA, a smart phone, a desktop computer, a netbook computer, a tablet computer, a laptop computer, and/or other suitable computing devices. The computer architecture 500 may be utilized to execute any aspects of the software components presented herein.

The computer architecture 500 illustrated in FIG. 5 includes a central processing unit 502 ("CPU"), a system memory 504, including a random access memory 506 ("RAM") and a read-only memory ("ROM") 508, and a system bus 510 that couples the memory 504 to the CPU 502. A basic input/output system containing the basic routines that help to transfer information between elements within the computer architecture 500, such as during startup, is stored in the ROM 508. The computer architecture 500 further includes a mass storage device 512 for storing the operating system 106 and the presentation program 108. In some embodiments, the mass storage device 512 also can be configured to store the presentation 110.

The mass storage device 512 is connected to the CPU 502 through a mass storage controller (not shown) connected to the bus 510. The mass storage device 512 and its associated computer-readable media provide non-volatile storage for the computer architecture 500. Although the description of computer-readable media contained herein refers to a mass storage device, such as a hard disk or CD-ROM drive, it should be appreciated by those skilled in the art that computer-readable media can be any available computer storage media or communication media that can be accessed by the computer architecture 500.

Communication media includes computer readable instructions, data structures, program modules, or other data in a modulated data signal such as a carrier wave or other transport mechanism and includes any delivery media. The term "modulated data signal" means a signal that has one or more of its characteristics changed or set in a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

By way of example, and not limitation, computer storage media may include volatile and non-volatile, removable and non-removable media implemented in any method or technology for storage of information such as computer-readable instructions, data structures, program modules or other data. For example, computer media includes, but is not limited to, RAM, ROM, EPROM, EEPROM, flash memory) or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can the accessed by the computer architecture 500. For purposes the claims, the phrase "computer storage medium" and variations thereof, does not include waves, signals, and/or other transitory and/or intangible communication media, per se.

According to various embodiments, the computer architecture 500 may operate in a networked environment using logical connections to remote computers through a network such as the network 104. The computer architecture 500 may connect to the network 104 through a network interface unit 514 connected to the bus 510. It should be appreciated that the network interface unit 514 also may be utilized to connect to other types of networks and remote computer systems, for example, the image source 112 and/or other entities, if desired. The computer architecture 500 also may include an input/output controller 516 for receiving and processing input from a number of other devices, including a keyboard, mouse, or electronic stylus (not shown in FIG. 5). Similarly, the input/output controller 516 may provide output to a display screen, a printer, or other type of output device (also not shown in FIG. 5).

It should be appreciated that the software components described herein may, when loaded into the CPU 502 and executed, transform the CPU 502 and the overall computer architecture 500 from a general-purpose computing system into a special-purpose computing system customized to facilitate the functionality presented herein. The CPU 502 may be constructed from any number of transistors or other discrete circuit elements, which may individually or collectively assume any number of states. More specifically, the CPU 502 may operate as a finite-state machine, response to executable instructions contained within the software modules disclosed herein. These computer-executable instructions may transform the CPU 502 by specifying how the CPU 502 transitions between states, thereby transforming the transistors or other discrete hardware elements constituting the CPU 502.

Encoding the software modules presented herein also may transform the physical structure of the computer-readable media presented herein. The specific transformation of physical structure may depend on various factors, in different implementations of this description. Examples of such factors may include, but are not limited to, the technology used to implement the computer-readable media, whether the computer-readable media is characterized as primary or secondary storage, and the like. For example, if the computer-readable media is implemented as semiconductor-based memory, the software disclosed herein may be encoded on the computer-readable media by transforming the physical state of the semiconductor memory. For example, the software may transform the state of transistors, capacitors, or other discrete circuit elements constituting the semiconductor memory. The software also may transform the physical state of such components in order to store data thereupon.

As another example, the computer-readable media disclosed herein may be implemented using magnetic or optical technology. In such implementations, the software presented herein may transform the physical state of magnetic or optical media, when the software is encoded therein. These transformations may include altering the magnetic characteristics of particular locations within given magnetic media. These transformations also may include altering the physical features or characteristics of particular locations within given optical media, to change the optical characteristics of those locations. Other transformations of physical media are possible without departing from the scope and spirit of the present description, with the foregoing examples provided only to facilitate this discussion.

In light of the above, it should be appreciated that many types of physical transformations take place in the computer architecture 500 in order to store and execute the software components presented herein. It also should be appreciated that the computer architecture 500 may include other types of computing devices, including hand-held computers, embedded computer systems, personal digital assistants, and other types of computing devices known to those skilled in the art. It is also contemplated that the computer architecture 500 may not include all of the components shown in FIG. 5, may include other components that are not explicitly shown in FIG. 5, or may utilize an architecture completely different than that shown in FIG. 5.

In some embodiments, some, all, or none of the elements of the computer architecture 500 illustrated and described herein are provided by one or more virtual computing resources and/or distributed computing resources. Thus, the computer architecture 500 can correspond to resources operating or executing on a network such as the network 104. In some embodiments, for example, the functionality of the CPU 502 can be provided by a processing resource provided by one or more server computers executing on a network, and the functionality of the system memory 504 can be provided by one or more network storage devices such as, for example, a datastore, a server computer, and/or other devices. As such, it should be understood that virtual computing resources or other distributed computing environments can execute any aspects of the software components disclosed herein.

Based on the foregoing, it should be appreciated that technologies for viewing presentations in a condensed animation mode have been disclosed herein. Although the subject matter presented herein has been described in language specific to computer structural features, methodological and transformative acts, specific computing machinery, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

We claim:

1. A computer-implemented method for viewing a presentation comprising at least one slide including a plurality of animations having an author-designated playback time period, the computer-implemented method comprising performing computer-implemented operations for:

receiving, at a presentation program, a command for initiating a condensed animation mode for viewing the presentation;

detecting a user input at the presentation program;

in response to detecting the user input, rendering the at least one slide; and playing a condensed animation sequence associated with the at least one slide, wherein playing the condensed animation sequence comprises, responsive to the command for initiating a condensed animation mode, playing each of the plurality of animations in an accelerated back-to-back manner without requiring user input to proceed through the plurality of animations, and wherein playing the condensed animation sequence is completed within a specified time period that differs from the author-designated playback time period.

2. The method of claim 1, further comprising:

in response to detecting further user input, determining if a playback of the condensed animation sequence is complete;

in response to determining that the playback of the condensed animation sequence is not complete, continuing the condensed animation sequence; and in response to determining that the playback of the condensed animation sequence is complete, determining if a further slide is available.

3. The method of claim 1, further comprising:

in response to detecting further user input, determining if a playback of the condensed animation sequence is complete; and in response to determining that the playback of the condensed animation sequence is not complete, interrupting the playback of the condensed animation sequence and determining if a further slide is available.

4. The method of claim 1, wherein playing the condensed animation sequence is performed in response to receiving another user input.

5. The method of claim 1, wherein playing the condensed animation sequence is performed in response to completing rendering of the slide.

6. The method of claim 1, wherein the command for initiating the condensed animation mode is received by the presentation program via a user interface comprising a UI control for initiating the condensed animation mode.

7. The method of claim 1, wherein the command for initiating the condensed animation mode comprises a setting associated with the presentation program.

8. The computer-implemented method of claim 1, wherein the at least one slide further comprises a plurality of effects, wherein the command further comprises a request to view the presentation while playing the plurality of effects in a back-to-back manner, and wherein playing the condensed animation sequence associated with the at least one slide further comprises playing each of the plurality of effects in an accelerated back-to-back manner without requiring user input to proceed through the plurality of effects.

9. The method of claim 1, wherein the presentation program executes on a user device that is at least one of a tablet computer or a smart phone, and wherein the presentation is obtained from a source remote from the user device.

10. The method of claim 9, wherein the presentation is obtained in response to a web search, and wherein the source comprises a server computer hosting the presentation.

11. An apparatus for viewing a presentation comprising at least one slide including a plurality of animations having an author-designated playback time period, the apparatus comprising:

a processor; and a computer-readable storage medium having computer-executable instructions stored thereupon which, when executed by the processor, cause the apparatus to receive a command for initiating a condensed animation mode for viewing the presentation, detect a user input, in response to detecting the user input, render the at least one slide, and play a condensed animation sequence associated with the at least one slide, wherein playing the condensed animation sequence comprises, responsive to the command for initiating the condensed animation mode, playing each of the plurality of animations in an accelerated back-to-back manner without requiring user input to proceed through the plurality of animations, and wherein playing the condensed animation sequence is completed within a specified time period that differs from the author-designated playback time period.

12. The apparatus of claim 11, wherein the computer-executable instructions further cause the apparatus to:

determine whether a playback of the condensed animation sequence is complete;

in response to determining that the playback of the condensed animation sequence is not complete, continue the condensed animation sequence; and in response to determining that the playback of the condensed animation sequence is complete, determine whether a further slide is available.

13. The apparatus of claim 11, wherein the computer-executable instructions further cause the apparatus to:

in response to detecting further user input, determine if a playback of the condensed animation sequence is complete, and in response to determining that the playback of the condensed animation sequence is not complete, interrupt the playback of the condensed animation sequence and determine if a further slide is available.

14. A computer storage medium comprising one or more of an optical disk, a solid state memory device, or a magnetic storage device having computer-readable instructions stored thereupon that, when executed by a computer, cause the computer to:

receive a command for initiating a condensed animation mode for viewing a presentation comprising at least one slide including a plurality of animations having an author-designated playback time period;

detect a user input;

in response to detecting the user input, render the at least one slide; and play a condensed animation sequence associated with the at least one slide, wherein playing the condensed animation sequence comprises, responsive to the command for initiating the condensed animation mode, playing each of the plurality of animations in an accelerated back-to-back manner without requiring user input to proceed through the plurality of animations, and wherein playing the condensed animation sequence is completed within a specified time period that differs from the author-designated playback time period.

15. The computer storage medium of claim 14, further comprising computer-executable instructions that, when executed by the computer, cause the computer to:
- in response to detecting further user input, determine if a playback of the condensed animation sequence is complete;
- in response to determining that the playback of the condensed animation sequence is not complete, continuing the playback; and
- in response to determining that the playback of the condensed animation sequence is complete, determining if a further slide is available.

16. The computer storage medium of claim 14, further comprising computer-executable instructions that, when executed by the computer, cause the computer to:
- in response to detecting further user input, determine if a playback of the condensed animation sequence is complete; and
- in response to determining that the playback of the condensed animation sequence is not complete, interrupt the playback and determine if a further slide is available.

17. The computer storage medium of claim 14, wherein playing the condensed animation sequence is performed in response to receiving another user input.

18. The computer storage medium of claim 14, wherein playing the condensed animation sequence is performed in response to completing rendering of the slide.

19. The computer storage medium of claim 14, wherein the command for initiating the condensed animation mode is received via a user interface comprising a user interface control for initiating the condensed animation mode.

20. The computer storage medium of claim 14,
- wherein the at least one slide further comprises a plurality of effects,
- wherein the command further comprises a request to view the presentation while playing the plurality of effects in a back-to-back manner, and
- wherein playing the condensed animation sequence further comprises playing the plurality of effects in an accelerated back-to-back manner without requiring user input to proceed through the plurality of effects.

\* \* \* \* \*